United States Patent
Tsoungui et al.

(10) Patent No.: US 12,259,902 B1
(45) Date of Patent: Mar. 25, 2025

(54) FEDERATING MULTIDIMENSIONAL OLAP DATA FROM DIFFERENT SOURCES

(71) Applicant: SAP SE, Walldorf (DE)

(72) Inventors: Olivier Tsoungui, Viry Chatillon (FR); Christian Ah-Soon, Carrieres-sur-Seine (FR)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/596,085

(22) Filed: Mar. 5, 2024

(51) Int. Cl.
  *G06F 16/24* (2019.01)
  *G06F 16/22* (2019.01)
  *G06F 16/2453* (2019.01)
  *G06F 16/25* (2019.01)

(52) U.S. Cl.
  CPC ........ *G06F 16/254* (2019.01); *G06F 16/2264* (2019.01); *G06F 16/24542* (2019.01)

(58) Field of Classification Search
  CPC ............. G06F 16/254; G06F 16/24542; G06F 16/2264
  See application file for complete search history.

(56) References Cited

U.S. PATENT DOCUMENTS

| | | | |
|---|---|---|---|
| 9,953,279 B1 * | 4/2018 | Hankins | G06Q 10/06 |
| 11,194,808 B1 * | 12/2021 | Adams | G06F 16/24544 |
| 11,455,308 B2 * | 9/2022 | Schwing | G06F 16/24554 |
| 2006/0248045 A1 * | 11/2006 | Toledano | G06F 16/258 |
| 2006/0271505 A1 * | 11/2006 | Vierich | G06F 16/283 |
| 2007/0061305 A1 * | 3/2007 | Azizi | G06F 16/283 |
| 2009/0265324 A1 * | 10/2009 | Mordvinov | G06F 16/245 |
| 2009/0307200 A1 * | 12/2009 | Ignat | G06F 16/283 |
| 2017/0097970 A1 * | 4/2017 | Bendel | G06F 16/254 |
| 2018/0246945 A1 * | 8/2018 | Lee | G06F 11/3476 |
| 2019/0220464 A1 * | 7/2019 | Butani | G06F 16/248 |
| 2020/0311078 A1 * | 10/2020 | Qiao | G06F 9/54 |
| 2020/0394191 A1 * | 12/2020 | Fender | G06F 16/212 |
| 2020/0394192 A1 * | 12/2020 | Fender | G06F 16/24542 |
| 2022/0147527 A1 * | 5/2022 | Hartsing | G06F 16/2264 |
| 2024/0095243 A1 * | 3/2024 | Weyerhaeuser | G06F 11/3419 |

* cited by examiner

*Primary Examiner* — Eliyah S. Harper
(74) *Attorney, Agent, or Firm* — SCHWEGMAN LUNDBERG & WOESSNER, P.A.

(57) ABSTRACT

A computer-implemented method may comprise creating a first view of a first data source comprising a first online analytical processing (OLAP) cube based on a first user input, creating a second view of a second data source based on a second user input, combining the first view and the second view, and creating metadata objects for elements of the first view and the second view. The method may further comprise generating a query execution plan comprising a first native query and a second native query based on a user-defined query specification and the metadata objects, executing the first native query on the first data source to retrieve a first dataset from the first data source and the second native query on the second data source to retrieve a second dataset from the second data source, and generating a federated dataset using the first dataset and the second dataset.

20 Claims, 13 Drawing Sheets

INSERT MULTIDIMENSIONAL OLAP VIEW

SELECT OBJECTS YOU WANT TO INSERT INTO THE MULTIDIMENSIONAL OLAP VIEW

CUBE OBJECTS

- ☑ ○ SALES — 310
  - ☑ SALES PERSON
    - ☑ SALES PERSON
      - ⟋ SALES PERSON
    - ☑ ATTRIBUTES
      - ☐ COMMISSION PERCENTAGE
      - ☑ BONUS
      - ☑ SALES TERRITORY
  - > PRODUCT
    - > ☐ PRODUCT
    - ☑ PRODUCT CATEGORIES
      - ⟋ CATEGORY
      - ⟋ PRODUCT
    - > ☐ ATTRIBUTES
    - ☑ NAMED SETS
      - ☑ {○} LONG LEAD PRODUCTS
      - ☑ {○} CORE PRODUCT GROUP
  - > CUSTOMER
  - > REGION
    - ☑ ORDER AMOUNT
    - ☑ ORDER QUANTITY
    - ☐ PRODUCT PRICE
    - ☐ KEYDATE VARIABLE: MANDATORY
    - ☐ SALES PERSON: OPTIONAL

[ < BACK ]  [ NEXT > ]  [ FINISH ]  [ CANCEL ]

*FIG. 3*

"SALES"

"SPERSON_LEVEL_01"
"SPERSON_BONUS"
"SPERSON_TERRITORY"
"PRODCAT_LEVEL_01"
"PRODCAT_LEVEL_02"
"AMOUNT"
"QUANTITY"

FIG. 4

| SPERSON_LEVEL_01 | SPERSON_BONUS | SPERSON_TERRITORY | PRODCAT_LEVEL_01 | PRODCAT_LEVEL_02 | AMOUNT | QUANTITY |
|---|---|---|---|---|---|---|
| NANCY DAVOLIO | 4500.00 | EUROPE | ACCESSORIES | <NULL> | 36860.00 | 597.00 |
| NANCY DAVOLIO | 4500.00 | EUROPE | ACCESSORIES | BIKE STANDS | 35840.00 | 512.00 |
| NANCY DAVOLIO | 4500.00 | EUROPE | BIKES | TOURING BIKES | 201600.00 | 252.00 |
| ROBERT KING | 4500.00 | EUROPE | BIKES | ROAD BIKES | 96100.00 | 124.00 |
| ROBERT KING | 5000.00 | ASIA | CLOTHING | SHORTS | 9720.00 | 324.00 |
| JANE DOE | 5000.00 | ASIA | CLOTHING | VESTS | 38600.00 | 375.00 |
| JANE DOE | 5000.00 | ASIA | BIKES | MOUNTAIN BIKES | 74000.00 | 37.00 |

"EMPLOYEES_PARENT"
"EMPLOYEES_CHILD"
"EMPL_SALARY"
"EMPL_SALESPERSON_FLAG"
"DEPARTMENT_LEVEL_01"
"EMPLOYEE_COUNT"

620

| EMPLOYEES_PARENT | EMPLOYEES_CHILD | EMPL_SALARY | EMPL_SALESPERSON_FLAG | DEPARTMENT_LEVEL_01 | EMPLOYEE_COUNT |
|---|---|---|---|---|---|
| <NULL> | SHERI NOWMER | 80000.00 | NO | APAC DEPARTMENT | 3.00 |
| <NULL> | SHERI NOWMER | 80000.00 | NO | NAFTA DEPARTMENT | 4.00 |
| <NULL> | SHERI NOWMER | 80000.00 | NO | EMEA DEPARTMENT | 10.00 |
| SHERI NOWMER | REBECCA KANAGI | 15000.00 | NO | APAC DEPARTMENT | 3.00 |
| REBECCA KANAGI | JUANITA SHARP | 6700.00 | YES | APAC DEPARTMENT | 2.00 |
| JUANITA SHARP | MARY PEACOCK | 11000.00 | NO | APAC DEPARTMENT | 1.00 |
| SHERI NOWMER | BOB DAMSTRA | 25000.00 | NO | NAFTA DEPARTMENT | 4.00 |

FIG. 6

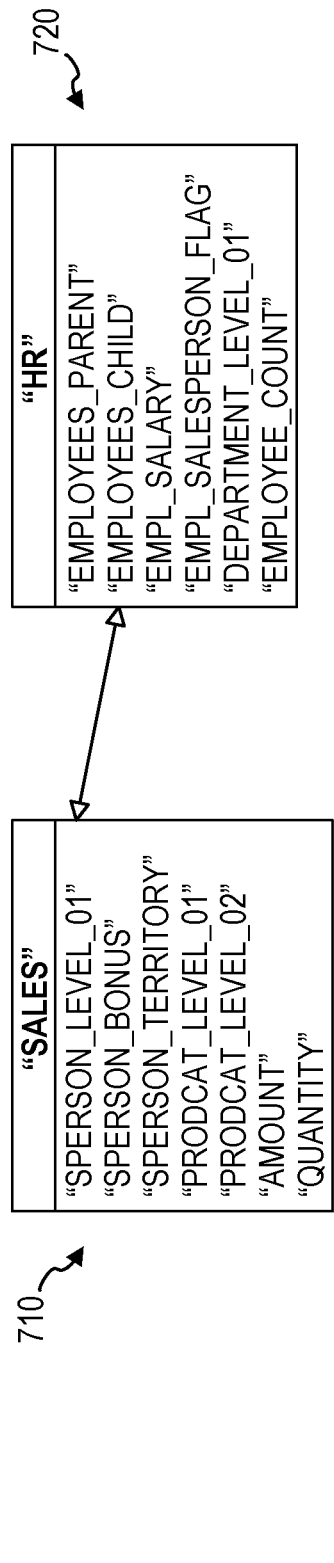

FIG. 7

| EMPLOYEES_PARENT | EMPLOYEES_CHILD | DEPARTMENT_LEVEL_01 | EMPLOYEE_COUNT | SPERSON_LEVEL_01 | AMOUNT | QUANTITY |
|---|---|---|---|---|---|---|
| <NULL> | SHERI NOWMER | APAC DEPARTMENT | 3.00 | <NULL> | <NULL> | <NULL> |
| <NULL> | SHERI NOWMER | NAFTA DEPARTMENT | 4.00 | <NULL> | <NULL> | <NULL> |
| <NULL> | SHERI NOWMER | EMEA DEPARTMENT | 10.00 | <NULL> | <NULL> | <NULL> |
| SHERI NOWMER | REBECCA KANAGI | APAC DEPARTMENT | 3.00 | <NULL> | <NULL> | <NULL> |
| REBECCA KANAGI | JUANITA SHARP | APAC DEPARTMENT | 2.00 | <NULL> | <NULL> | <NULL> |
| JUANITA SHARP | MARY PEACOCK | APAC DEPARTMENT | 1.00 | MARY PEACOCK | 58125.00 | 75.00 |
| SHERI NOWMER | BOB DAMSTRA | NAFTA DEPARTMENT | 4.00 | MARY PEACOCK | 52000.00 | 52.00 |

FIG. 8

QUERY PANEL

RESULT OBJECTS

- EMPLOYEES
  - ALL MEMBERS FROM EMPLOYEES
  - 1 MEMBERS

SALES PERSON FLAG

AMOUNT | QUANTITY

↙ 1310

QUERY RESULT — 1300

| EMPLOYEES | SALES PERSON FLAG | AMOUNT | QUANTITY |
|---|---|---|---|
| ⌄ SHERI NOWMER | NO | 826,950 | 5,598 |
| ⌄ REBECCA KANAGI | NO | 182,285 | 941 |
| ⌄ JUANITA SHARP | YES | 182,285 | 941 |
| MARY PEACOCK | NO | 182,285 | 941 |
| ⌄ BOB DAMSTRA | NO | 134,125 | 934 |
| NATHAN MUENICH | YES | 366,430 | 2,387 |
| JENNIFER COOPER | NO | 144,110 | 1,336 |
| ROBERT KING | NO | 134,125 | 934 |
| DERRICK WHELPY | YES | 510,540 | 3,723 |

FEDERATING MULTIDIMENSIONAL OLAP DATA FROM DIFFERENT SOURCES

TECHNICAL FIELD

The present application relates generally to the technical field of computer systems, and, in various embodiments, to systems and methods of federating multidimensional online analytical processing (OLAP) data from different data sources.

BACKGROUND

Data federation is a software process that allows multiple data sources, such as databases, to function as one. Current data federation solutions are limited to relational data models and not suitable for multidimensional data coming from online analytical processing (OLAP) data sources. As a result, current data federation solutions are not able to use multidimensional OLAP features, such as hierarchies, named sets, and calculated members, thereby limiting the ability of computer systems to effectively process multidimensional data. Other technical challenges may arise as well.

BRIEF DESCRIPTION OF THE DRAWINGS

Some example embodiments of the present disclosure are illustrated by way of example and not limitation in the figures of the accompanying drawings, in which like reference numbers indicate similar elements.

FIG. 3 shows an example graphical user interface (GUI) in which an OLAP cube is mapped in an OLAP view in a multi-source data foundation layer.

FIG. 4 shows an example of an OLAP view created and generated in a multi-source data foundation from selected objects of an OLAP cube.

FIG. 5 shows an example result for all values of this OLAP view.

FIG. 6 shows an example of a new OLAP view having been added to the multi-source data foundation layer from an OLAP cube and a data sample corresponding to the new OLAP view.

FIG. 7 shows an example of join between two OLAP views from different sources.

FIG. 8 shows an example of a sample of two linked OLAP views.

FIG. 13 shows an example of a query returning a query result from one OLAP view for members from another OLAP view.

DETAILED DESCRIPTION

Figure 1:
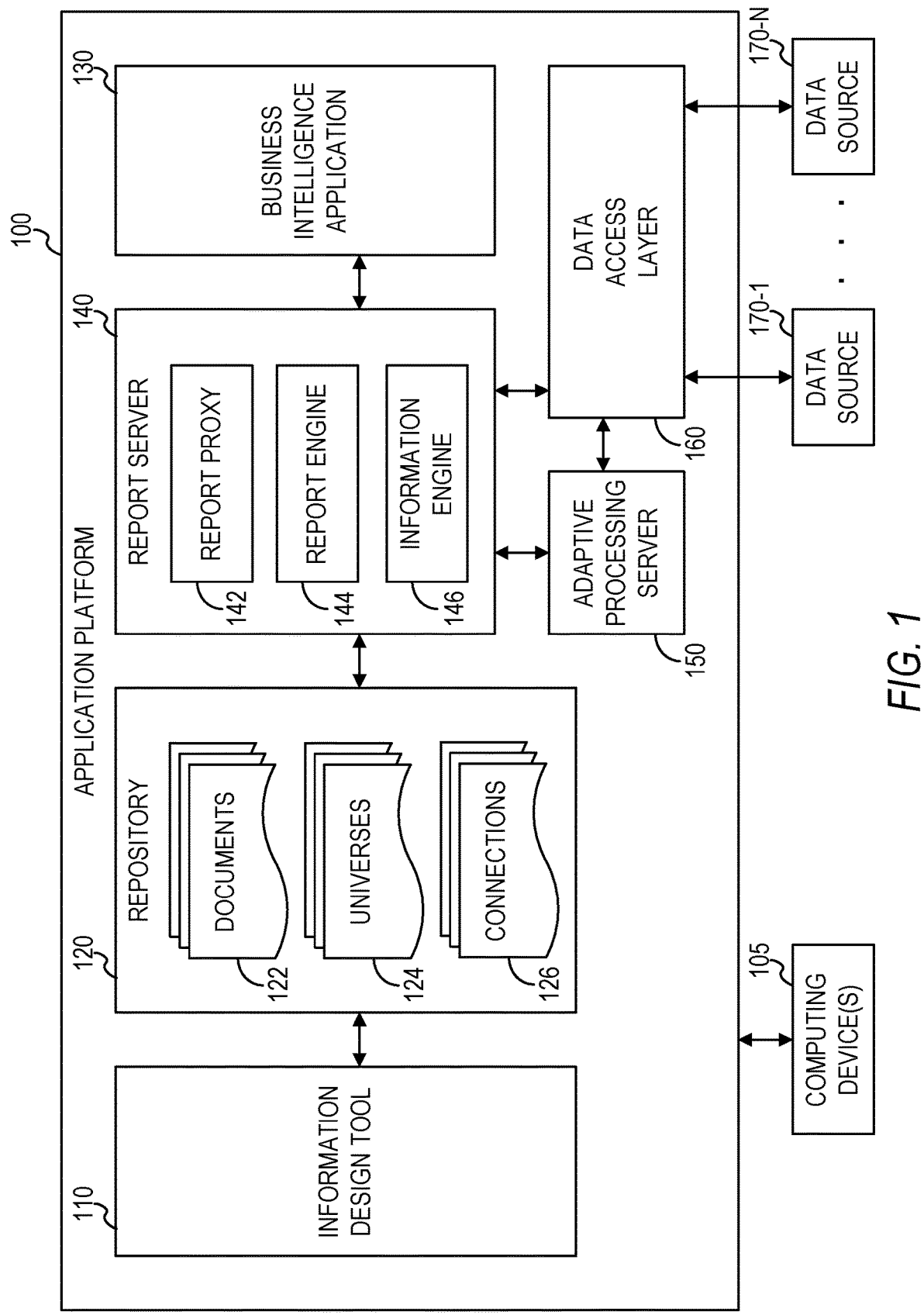
FIG. 1 is a block diagram illustrating components of an example application platform.

Example methods and systems of federating multidimensional online analytical processing (OLAP) data from different data sources are disclosed. In the following description, for purposes of explanation, numerous specific details are set forth in order to provide a thorough understanding of example embodiments. It will be evident, however, to one skilled in the art that the present embodiments can be practiced without these specific details.

The implementation of the features disclosed herein involves a non-generic, unconventional, and non-routine operation or combination of operations. By applying one or more of the solutions disclosed herein, some technical effects of the system and method of the present disclosure are to implement federation of multidimensional online analytical processing (OLAP) data from different data sources. In some example embodiments, a computer system may perform a computer-implemented method comprising creating a first view of a first data source in a data foundation layer of an application platform based on a first user input, where the first data source comprises a first OLAP cube, and creating a second view of a second data source in the data foundation layer based on a second user input, where the second data source is different from the first data source, and then combining the first view of the first data source and the second view of the second data source in the data foundation layer. The computer-implemented method may further comprise creating metadata objects for elements of the first view of the first data source and the second view of the second data source in the data foundation layer, and then generating a query execution plan based on a user-defined query specification and the metadata objects in the data foundation layer, where the query execution plan comprises a first native query and a second native query. The first native query may then be executed on the first data source to retrieve a first dataset from the first data source, and the second native query may be executed on the second data source to retrieve a second dataset from the second data source. A federated dataset may then be generated using the first dataset and the second dataset.

The features of the present disclosure enable a computer system to federate any multidimensional OLAP data inside multi-source universes, without OLAP system administrator actions and without adding new metadata to the OLAP data source, as well as to enable users to leverage OLAP features, such as hierarchies, names sets, and calculated members inside multi-source environments. Additionally, the features of the present disclosure may also enable a computer system to combine and unify multidimensional OLAP data models with other OLAP or relational data models using any type of joins inside multi-source data foundation layers with respect to multidimensional OLAP concepts. The features of the present disclosure may also enable a computer system to merge multidimensional OLAP data with other data models. As a result, the ability of the computer system to effectively and efficiently integrate and federate data from different data sources is improved. Other technical effects will be apparent from this disclosure as well.

The methods or embodiments disclosed herein may be implemented as a computer system having one or more modules (e.g., hardware modules or software modules). Such modules may be executed by one or more hardware processors of the computer system. In some example embodiments, a non-transitory machine-readable storage device can store a set of instructions that, when executed by at least one processor, causes the at least one processor to perform the operations and method steps discussed within the present disclosure.

The details of one or more variations of the subject matter described herein are set forth in the accompanying drawings and the description below. Other features and benefits of the subject matter described herein will be apparent from the description and drawings, and from the claims.

FIG. 1 is a block diagram illustrating components of an example application platform 100. The application platform 100, (e.g., machines and software) may comprise a framework of services that application programs rely on for standard operations. The application platform 100 may provide a runtime environment for application logic. The application platform 100 may provide server-side functionality, via a network (e.g., the Internet), to one or more clients, such as computer hardware or software running on one or more computing devices 105.

In some example embodiments, the application platform 100 comprises any combination of one or more of an information design tool 110, a repository 120, one or more business intelligence applications 130, a report server 140, an adaptive processing server 150, and a data access layer 160. The information design tool 110, the repository 120, the business intelligence application 130, the report server 140, the adaptive processing server 150, and the data access layer 160 can reside on a computer system, or other machine, of the application platform 100 having a memory and at least one processor (not shown).

The information design tool 110 and the business intelligence application 130 may be configured to provide a variety of user interface functionality, such as generating user interfaces, interactively presenting user interfaces to the user, receiving information from the user (e.g., interactions with user interfaces), and so on. Presenting information to the user can include causing presentation of information to the user (e.g., communicating information to a device with instructions to present the information to the user). Information may be presented using a variety of means including visually displaying information and using other device outputs (e.g., audio, tactile, and so forth). Similarly, information may be received via a variety of means including alphanumeric input or other device input.

In some example embodiments, the information design tool 110 and the business intelligence application 130 are configured to receive user input. For example, the information design tool 110 and the business intelligence application 130 can present one or more graphical user interface (GUI) elements (e.g., drop-down menu, selectable buttons, text field) with which a user can submit input via the computing device(s) 105. In some example embodiments, the information design tool 110 and the business intelligence application 130 are configured to perform various communication functions to facilitate the functionality described herein, such as by communicating with the computing device(s) 105 via a network using a wired or wireless connection, as well as by communicating with a plurality of data sources 170 (e.g., data source 170-1 to data source 170-N, where N is a positive integer greater than one) and other components of the application platform 100.

The data sources 170 may comprise multiple data sources 170 of the same type, as well as multiple data sources of different types. For example, the data sources 170 may comprise a first data source 170-1 that comprises a first OLAP cube and a second data source 170-2 that comprises a second OLAP cube. The data sources 170 may additionally or alternatively comprise a first data source 170-1 that comprises a first OLAP cube and a second data source 170-2 that comprises a relational database. Other configurations of the data sources 170 are also within the scope of the present disclosure.

An OLAP cube is a multi-dimensional array of data. Each OLAP cube may contain data categorized by dimensions (e.g., customers, geographic sales region, time period) derived by dimensional tables. Dimensions may be populated by members (e.g., customer names, countries, months) that may be organized hierarchically. A relational database is a collection of information that organizes data points with defined relationships for easy access. In the relational database model, the data structures (e.g., data tables, indexes, views) remain separate from the physical storage structures. In addition to or as an alternative to OLAP cubes and relational databases, other types of data sources 170 are also within the scope of the present disclosure.

The information design tool 110 may be configured to extract data from the data sources 170 using a data source connection to create universes 124. The universes 124 are logical collections of dimensions and objects that allow users to analyze data. Objects and dimension represent different hierarchies, measures, custom calculations, and attributes. Each universe 124 functions as a semantic layer and can be situated between the technical-oriented data source 170 and end users of the application platform 100. This semantic layer takes care of the translation of tables and columns to meaningful terms in such a way that end users do not need to know any query language. The semantic layer contains metadata about the table columns and their relationships within the underlying data sources 170. This semantic layer is presented in a universe 124 by the use of classes and objects. The universe may be designed with the information design tool 110. The universes 124 created using the information design tool 110 can be used with different reporting tools of the business intelligence application 130. The universes 124 may be published to the repository 120 for use by the business intelligence application 130, such as in reporting and dashboard tools.

In some example embodiments, the business intelligence application 130 is configured to perform analytics functions, including, but not limited to, reporting, online analytical processing, analytics, data mining, process mining, complex event processing, business performance management, benchmarking, text mining, predictive analytics, and prescriptive analytics. The business intelligence application 130 may allow for the easy interpretation of big data. The business intelligence application 130 may be configured to enable users to regroup dimension values stored in the data source(s) 170 under custom groups within reports for a better data analysis (e.g., to group months into quarters). For users, grouping data is very helpful because it offers a simple way to generate data and metadata to reorganize corporate data inside reports without needing professional information technology services.

Universe objects (e.g., dimensions, measures, attributes, filters, etc.), may be saved in the universe 124 for future use in the business intelligence application 130. At consumption, business intelligence application 130 may consume the universe objects in reports in using them in query panels, such as through query filters. In querying data sources 170 that comprise relational databases, the application platform 100 may use standard SQL clauses such as UNION operators, and SQL extensions such as COMMON TABLE EXPRESSIONS (CTE). In querying OLAP Multidimensional Expressions (MDX) databases, the application platform 100 may combine MDX queries and local data processing. These technical details of the data source queries are hidden by the universe semantic layer that provide a common, simple, easy-to-use interface for the business intelligence application 130 and users of the business intelligence application 130.

The business intelligence application 130 may communicate with the repository 120 via a report proxy 142 of the report server 140. The business intelligence application 130 may access objects available in universes 124 created using the information design tool 110 or in documents 122 created using the business intelligence application 130 in order to create reports. A user can use objects of the universes 124 to create a report, such as by using the objects in a query panel to define query specifications, including hierarchy member selections and query filters on the hierarchies. At runtime, these query specifications may be transmitted to an information engine 146 of the report server 140 for treatment. For example, the information engine 146 may first load the universe 124 from the repository 120 (or cache) in order to get the definition of the hierarchies, as well as the data connection type from stored connection data, and then, based on the connection type, generate a native query script according to the query specification that will be executed to the data sources 170 in order to retrieve query result sets.

In some cases, a local processing can be performed to complete the actions. Once the query result sets are retrieved by the information engine 146, the data may be formatted according to user settings and displayed on the computing device 105 of the user of the business intelligence application 130. The metadata definition for objects (e.g., hierarchies) used in the query may also be transmitted to a report engine 144 of the report server 140 for reporting workflows (e.g., collapse/expand, fold/unfold, hierarchical formulas, etc.).

In some example embodiments, a user acting as a universe designer can browse OLAP connections in the repository 120 and select one to create or insert new multidimensional data models inside multi-source universes 124 for reporting or analysis requirements. The universe designer may create a new multi-source data foundation layer to insert the selected OLAP connections. In this multi-source data foundation layer, the universe designer may create OLAP views from different OLAP cubes and combine them by using any join operator, including, but not limited to, inner joins, left joins, right joins, full outer joins, equi-joins, and theta-joins, as well as other types of join operators. The data foundation layer may comprise an abstraction layer into which a user can insert and join several types of objects. The data foundation layer describes the data schema on which the universe 124 is based. The data foundation layer may contain one or more tables or views, as well as joins from one or more data sources 170.

The universe designer may generate a business layer on top of this new multi-source data foundation layer. The business layer may comprise a universe high-level layer that proposes a business abstraction to end-users. This abstraction prevents them to have a deep technical knowledge of the underlying data source 170. The business layer consists of business objects such as dimensions, hierarchies, measures, attributes, and filter conditions. The universe designer may publish this multi-source universe to the repository 120 so that it can be shared and consumed by all tools of the business intelligence application 130.

To create reports on federated data from various OLAP cubes, a user acting as a report creator can browse and select multi-source universes 124 based on multidimensional data from the repository 120 via the report proxy 142. The report creator can use the selected multi-source universe 124 in a query panel of the business intelligence application 130 to define query specifications including multi-source objects based on various OLAP databases. At runtime, these query specifications may be sent to the information engine 146 for processing.

When a query with multi-source objects based on various OLAP databases has been requested, the information engine 146 may first load the multi-source universe 124 from the repository 120 or cache in order to get the definition of OLAP views, as well as the impacted data connection types from the connections 126. The information engine 146 may generate a query execution plan based on the query specification and the connection types, and the query execution plan may be sent to a data federation service of the adaptive processing server 150 for processing. The data federation service may process the query execution plan by first running all the native queries in the query execution plan to retrieve all raw data in memory. These native queries may be run by the data access layer 160 to obtain database data from the respective data sources 170. Then, the execution of local operations or instructions may be performed by the report engine 144 based on the query execution plan to produce a result of a federated dataset according to the query specification. The federated data and metadata retrieved by the final query result sets may be stored in a local database of the document in the report engine 144. The report creator can create tables, charts, sections, sorts or filters that are then processed by the report engine on top of the federated data.

By creating combined cubes in the business intelligence application 130, the report creator can also federate multidimensional OLAP data inside documents having multiple data sources 170 based on OLAP cubes. Once created, the report creator can share an aggregated model by publishing the document 122 to the repository 120. Once published into the repository 120, tools of the business intelligence application 130 can access federated multidimensional data available in multi-source universes 124 or in documents 122 to create reports.

Figure 2:
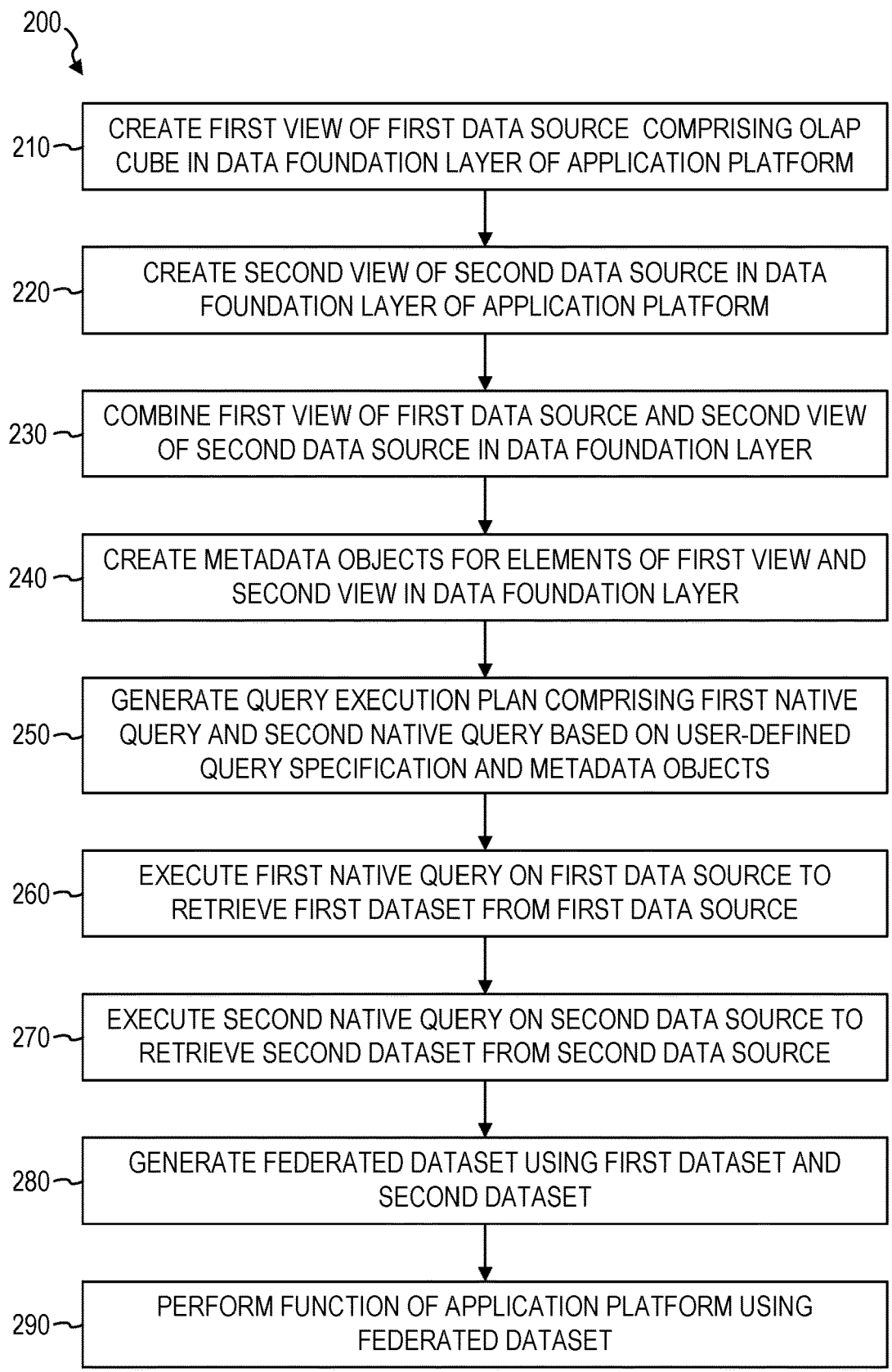
FIG. 2 is a flowchart illustrating an example method of federating multidimensional OLAP data from different sources.

FIG. 2 is a flowchart illustrating an example method 200 of federating multidimensional OLAP data from different sources. The method 200 can be performed by processing logic that can comprise hardware (e.g., circuitry, dedicated logic, programmable logic, microcode, etc.), software (e.g., instructions run on a processing device), or a combination thereof. In one example embodiment, one or more of the operations of the method 200 are performed by a computer system, such as a computer system on which the application platform 100 of FIG. 1 or any combination of one or more of the components of the application platform 100 resides.

At operation 210, the application platform 100 may create a first view of a first data source 170-1 in a data foundation layer of the application platform 100 based on a first user input. The first data source 170-1 may comprise a first online analytical processing (OLAP) cube. In some example embodiments, the first user input may comprise a selection of at least one hierarchy and at least one measure of the first OLAP cube.

The application platform 100 may also, at operation 220, create a second view of a second data source 170-2 in the data foundation layer based on a second user input, where the second data source 170-2 is different from the first data source 170-1. The second data source 170-2 may comprise a second OLAP cube different from the first OLAP cube. However, the second data source 170-2 may comprise other types of data sources as well. For example, the second data source 170-2 may comprise a first relational database.

Next, the application platform 100 may combine the first view of the first data source 170-1 and the second view of the second data source 170-2 in the data foundation layer, at operation 230. In some example embodiments, the combining of the first view of the first data source 170-1 and the second view of the second data source 170-2 in the data foundation layer may comprise combining the first view and the second view into a single data scheme using a join operation. However, other ways of combining the first view of the first data source 170-1 and the second view of the second data source 170-2 are also within the scope of the present disclosure.

At operation 240, the application platform 100 may create metadata objects for elements of the first view of the first data source 170-2 and the second view of the second data source 170-2 in the data foundation layer. Examples of metadata objects that the application platform 100 may create from the first view and the second view include, but are not limited to, measures, attributes, dimensions, hierarchies, and names sets. Other types of metadata objects are also within the scope of the present disclosure.

Then, the application platform 100 may, at operation 250, generate a query execution plan based on a user-defined query specification and the metadata objects in the data foundation layer. The query execution plan may comprise a first native query and a second native query. In some example embodiments, the query execution plan comprises a tree structure, and the tree structure comprises corresponding nodes for the first native query and the second native query. However, other configurations of the query execution plan are also within the scope of the present disclosure.

Next, the application platform 100 may execute the first native query on the first data source to retrieve a first dataset from the first data source, at operation 260. The application platform 100 may also, at operation 270, execute the second native query on the second data source to retrieve a second dataset from the second data source.

At operation 280, the application platform 100 may generate a federated dataset using the first dataset and the second dataset. For example, the application platform 100 may merge the first dataset and the second dataset into the federated dataset, which may be contained within a combined cube.

Then, the application platform 100 may, at operation 290, perform a function of the application platform 100 using the federated dataset. For example, the function may comprise causing the federated dataset to be displayed on a computing device 105. In another example, the function may comprise performing one or more analytics functions using the federated dataset. In yet another example, the function may comprise storing the federated dataset on the application platform 100.

It is contemplated that any of the other features described within the present disclosure can be incorporated into the method 200.

In some example embodiments, the application platform 100 may be configured to map multidimensional OLAP data of an OLAP data source 170 inside multi-source universes 124 and to combine them with other OLAP or relational data sources 170. A multidimensional OLAP data model may be represented by a multidimensional cube that is a named collection of dimensions and measures. Dimensions are logic representations of members in the cube, whereas measures represent aggregations over dimensions. The members of a multidimensional cube may be organized in dimensions, hierarchies, and levels. Each dimension may have one or more hierarchies. Each hierarchy is composed of a set of levels. Levels have a hierarchical organization, such that a level may have a parent level and/or a child level. Attributes (also referred to as dimension properties) may also be associated to dimension members to complete or provide more details.

For queries or views, multidimensional cubes may comprise variables that are symbolic placeholders for values for runtime. These variables can be optional or mandatory at runtime. A view may comprise a result set of a stored query, which can be queried in the same manner as a persistent database collection object. Data about an application object is often distributed on several tables. By defining a view, a user can define an application-dependent view that combines this data. The structure of such a view is defined by specifying the tables and fields used in the view. Fields that are not required can be hidden, thereby minimizing interfaces.

In some example embodiments, the application platform 100 is configured to extend a multi-source data foundation by creating OLAP views to map multidimensional OLAP data models in the multi-source data foundation model. To map a multidimensional OLAP cube inside a multi-source data foundation, the application platform 100 may use an OLAP view that models the OLAP cube in the multi-source data foundation layer. The OLAP view may be used at query time to retrieve data from the multidimensional OLAP cube. An OLAP view may be defined by a list of organized entries, where each entry references a user-selected object in the target OLAP cube. These objects may include all levels of each hierarchy selected from the OLAP cube, the measures or calculated measures selected from the OLAP cube, the attributes selected from the OLAP cube, the variables selected from the OLAP cube, and the named sets and calculated members selected from the OLAP cube. These selected named sets and calculated members could be used later in a query panel of the business intelligence application 130 to define the hierarchy member sets at query time. In some example embodiments, when creating an OLAP view from a multidimensional OLAP cube, at least one hierarchy and one measure are selected from the OLAP cube.

The application platform 100 may support two hierarchy types in OLAP cubes. The first hierarchy type comprises level-based hierarchies that have rigid structures organized into ordered sets of logical levels. When selecting a level-based hierarchy in an OLAP cube, each of its logical levels is also automatically selected and generates an entry in the OLAP view. The second hierarchy type comprises parent-child hierarchies that have structures (without logical levels) only based on parent-child relationships. When selecting a parent-child hierarchy in an OLAP cube, the OLAP view definition contains an entry for the child level, and another one for the parent level representing the level from which the child members are referenced.

FIG. 3 shows an example GUI in which an OLAP cube is mapped in an OLAP view in a multi-source data foundation layer. The GUI 300 may include selectable user interface elements 310 corresponding to objects of the OLAP cube. The user may use the computing device 105 to select objects that the user wants to insert into the multidimensional OLAP view, such as by selecting the corresponding user interface elements 310 of the objects that the user wants to insert into the multidimensional view. In the example shown in FIG. 3, the OLAP cube is named "SALES" and the following cube objects are selected to create an OLAP view in the multi-source data foundation layer: the Sales Person hierarchy and its levels, some attributes of the Sales Person dimension, the Product Categories hierarchy and its levels, all named sets of the Product Categories hierarchy, the Order Amount measure, and the Order Quantity measure. FIG. 4 shows an example of an OLAP view 400 created and generated in a multi-source data foundation from selected objects of the OLAP cube of FIG. 3. FIG. 5 shows an example result 500 for all values of the OLAP view of FIG. 4.

In some example embodiments, member captions may, by default, be retrieved in the results for selected hierarchy levels from the OLAP cube. However, when designing the OLAP view in the multi-source data foundation layer, the application platform 100 may provide additional options to configure how data should be retrieved from the OLAP cube or what data is needed. For example, the application platform 100 may provide a "Retrieve Empty Rows" option, where the queries to the OLAP view may return empty rows when the data of the cube is sparse. By disabling this "Retrieve Empty Rows" option, the application platform 100 may avoid retrieving the combinations of members whose measures do not have a value.

The application platform 100 may also provide a "Retrieve Member Keys" option, where, for each selected hierarchy, the application platform 100 provides an option to also retrieve the member keys for hierarchy levels. When enabled for a selected hierarchy, additional extra fields, ending with "_key", may be added for each of the hierarchy's levels in the OLAP view. These extra fields for member keys can be used to resolve data uniqueness.

In some example embodiments, the application platform 100 may be configured to enable users to create and insert multiple OLAP views from different OLAP cubes inside the same multi-source data foundation layer. OLAP views can also be mixed with relational tables or views coming from relational sources inside a multi-source data foundation layer. If the multi-source data foundation layer contains multiple OLAP views, the application platform 100 may combine all the data into a single data schema by creating multi-source joins between different OLAP views. If the multi-source data foundation layer contains both OLAP views and relational tables, the application platform 100 may create multi-source joins between these OLAP views and relational tables. The application platform 100 may be configured to support the INNER, LEFT, RIGHT, and FULL OUTER operators to join different OLAP views and tables. On an OLAP view, a join may be performed by setting up one or more join clauses on hierarchy level or attribute entries. The application platform 100 may be configured to support a variety of other joins as well, including, but not limited to, equi-joins (based on equality operator), theta joins (based on comparison operators other than equal) between different OLAP views and tables, and self-restricting joins to define column filters on OLAP views.

The application platform 100 may create multi-source joins between OLAP views and relational tables inside multi-source data foundations. At runtime, multi-source joins may be locally processed by a semantic layer of the information engine 146 if the impacted OLAP views or tables are based on different data sources. Otherwise, the processing of these multi-source joins may be delegated to the data source when possible.

FIG. 6 shows an example of a new OLAP view 610 having been added to the multi-source data foundation layer from an OLAP cube, such as via the GUI 300, and a data sample 620 corresponding to the new OLAP view.

In the example shown in FIG. 6, the new OLAP view 610 is named HR and includes the following objects: the Employees and Department hierarchies with their levels ("EMPLOYEES_PARENT," "EMPLOYEES_CHILD," and "DEPARTMENT_LEVEL_01"), some attributes of Employee dimension ("EMPL_SALARY" and "EMPL_SALESPERSON_FLAG"), and the Number of employees measure ("EMPLOYEE_COUNT"). In this example, the Employees hierarchy is a parent-child hierarchy.

FIG. 7 shows an example of join between two OLAP views from different sources, a SALES OLAP view 710 (corresponding to OLAP view 400 in FIG. 4) and an HR OLAP view 720 (corresponding to OLAP view 610 in FIG. 6). In this example, the HR OLAP view 720 is linked to the SALES OLAP view 710 by creating a LEFT OUTER join between entries EMPLOYEES_CHILD and SPERSON_LEVEL_01. FIG. 8 shows an example of a sample 800 of the two linked OLAP views 710 and 720. As seen by the examples shown in FIGS. 7 and 8, the linking of the two OLAP views 710 and 720 enables users to query all employee records.

In some example embodiments, the application platform 100 may be configured to create business layers on top of OLAP views created in multi-source data foundation layers. The application platform 100 may enable measures to be mapped on OLAP measures selected in the OLAP view, attributes to be mapped on OLAP dimension attributes selected in the OLAP view, dimensions to be mapped on OLAP hierarchy levels selected in the OLAP view, hierarchies to be redefined with the levels mapped on OLAP hierarchy levels selected in the OLAP view, and named sets to be mapped on OLAP named sets selected in the OLAP view.

Figure 9:
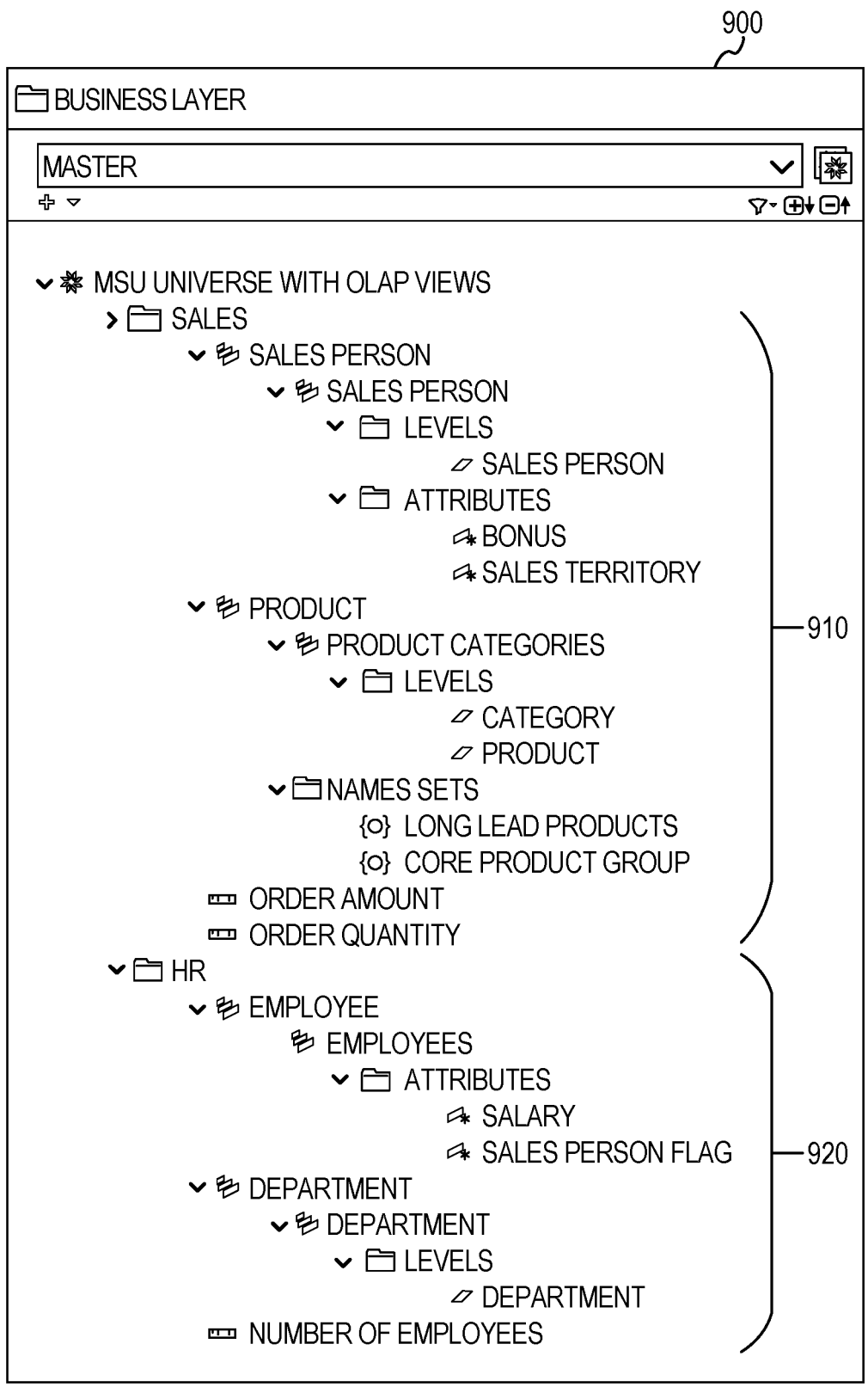
FIG. 9 shows an example of universe objects created from two different OLAP views inserted in a multi-source data foundation layer.

FIG. 9 shows an example GUI 900 in which universe objects created from two different OLAP views have been inserted in a multi-source data foundation layer. In the example shown in FIG. 9, the universe objects created from "SALES" and "HR" OLAP views, 910 and 920, respectively, have been inserted in the multi-source data foundation layer as described in the above sections. Once these objects defined on top of OLAP views are saved in a published multi-source universe, the business intelligence application 130 may query them to retrieve datasets from both the OLAP and relational databases, aggregate them and save them in documents or stories.

Like all universe objects (e.g., dimensions, hierarchies, measures, attributes, filters, etc.), those created on top of OLAP views in multi-source universes can also be used in query panels to create ad-hoc queries for reporting. In query panels, these objects can be used as result objects, or as query filters, regardless of their bindings to their different sources of origin. The hierarchies based on OLAP views may be used to define member sets through hierarchical member selections or query filters in query panels. If the multi-source universe combines both OLAP views and relational data sources, the queries defined on top of it may also use and mix objects coming from both OLAP views and relational data sources.

When running a query with result objects based on OLAP views, the result may be flattened with one result column for each result object. If the result object is a hierarchy based on an OLAP view, the semantic layer of the information engine 146 may replace the hierarchy column by four default hierarchy column properties in the query result. These hierarchy column properties are described as follows:

| Hierarchy Column Property | Description |
|---|---|
| MEMBER_CAPTION | Mandatory. This hierarchy column property provides the display name of hierarchy members. |
| MEMBER_PARENT | Mandatory. This hierarchy column property provides the parent member of hierarchy members. |
| MEMBER_KEY | Optional. This hierarchy column property provides the key of hierarchy members. This column property is only available if the Retrieve Member Keys option is enabled for the hierarchy |
| MEMBER_DEPTH | Optional. This hierarchy column property provides the distance of hierarchy members fromt he root, which is zero. |

The semantic layer of the information engine 146 may use MEMBER_PARENT with MEMBER_KEY (available when the "Retrieve Member Keys" option is enabled) or MEMBER_CAPTION column properties to hierarchize hierarchical data after executing the query to the database. The combination of these column properties enables the information engine 146 to determine the parent-child relationships between hierarchy members, and to re-build the hierarchy in reports. The MEMBER_DEPTH may be used to improve the hierarchizing algorithms performance.

In some example embodiments, when running a query on top of a multi-source universe, the semantic layer of the information engine 146 may first generate a query execution plan that represents the set of instructions or operations to process to retrieve federated data. The generation of this query execution plan may depend on the query specification defined in a query panel, as well as query capabilities of adjacent data sources. The query execution plan may be represented as a tree-like structure in which instructions or operations are represented as nodes in the tree. The table below provides one example of the operations supported in query execution plans on multi-source universes:

| Operation node | Description |
|---|---|
| AGGREGATION | Aggregates the child node by performing SUM, COUNT, MIN, MAX, or AVERAGE calculations. |
| FILTER | Filters each row coming from the child node, only passing through rows that evaluate the predicates to true. |
| INTERSECT | Returns distinct rows that are output of both the left and right child nodes. |
| JOIN | Joins two child nodes with INNER, LEFT, RIGHT, or FULL OUTER joins. |
| MINUS | Returns distinct rows from the left child node that are not output of the right child node. |
| NATIVE_QUERY | Provides raw dataset from data sources via native queries. |
| RANK | Ranks the child node rows to keep top or bottom rows according to a defined criteria. |
| SORT | Sorts rows of the child node by a provided key. |
| UNION | Concatenates the results of two child nodes into a single result. |

Except for NATIVE-QUERY nodes, all operation nodes may be locally processed by the semantic layer of the information engine 146. However, when generating the query execution plan, the semantic layer of the information engine 146 may attempt to push the maximum number of instructions or operations in native queries to reduce the local data processing. In query execution plans on multi-source universes, the leaf nodes may be native queries, and they locate the starting nodes and relationships required to execute the query.

In addition to native SQL queries for relational databases, the application platform 100 may implement native OLAP queries to execute any native query on OLAP databases. In some example embodiments, the application platform 100 is configured to use an OLAP query model to execute native queries on OLAP cubes referenced by OLAP views in multi-source universes. This OLAP query model may comprise a named collection of query axes used as follows on multi-source universes: a COLUMNS axis to specify the collection of measures and calculated measures requested in the query specification, a ROWS axis to specify the collection of member sets of dimensions, hierarchies, named sets, calculated members and attributes requested in the query specification, and a FILTERS axis to specify the background filters requested in the query specification. This OLAP query model may apply to the elements of a single OLAP cube. At execution time, the semantic layer of the information engine 146 may translate it to Multidimensional Expressions (MDX) query scripts or to other types of query views to execute and retrieve raw data from the target OLAP databases. The raw data may be flattened into tabular results to be easily treated by subsequent operations.

The following use cases describe OLAP query examples generated by the semantic layer of the information engine 146 on top of multi-source universes with OLAP views. In these examples, the target data sources are OLAP MDX databases.

Figure 10:
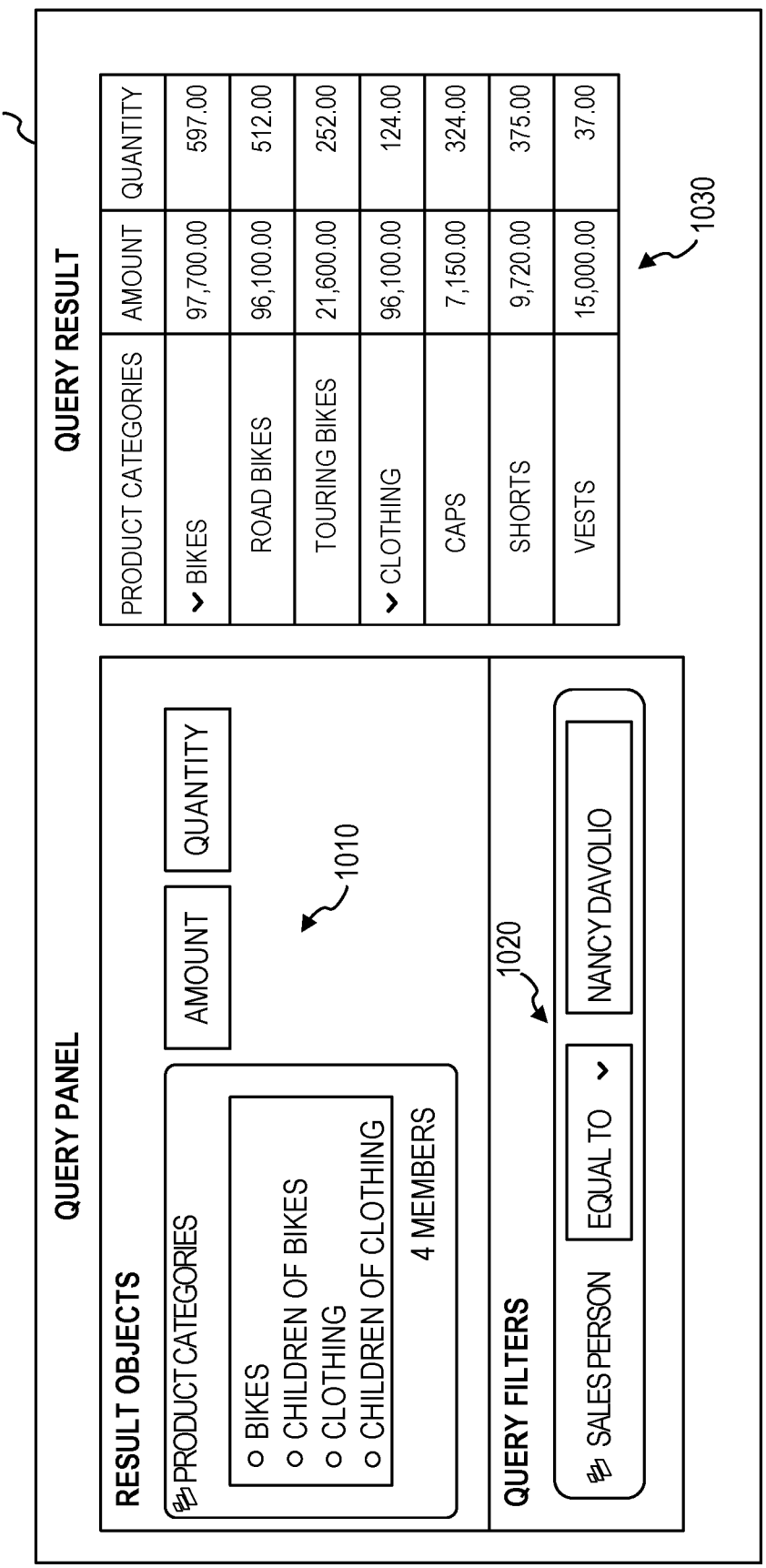
FIG. 10 shows an example of a query specification using objects coming only from one OLAP view.

In the first use case, one OLAP view is queried. FIG. 10 shows an example GUI 1000 in which a query specification using objects coming only from one OLAP view, the SALES OLAP view, has been configured by a user. The GUI may include one or more selectable user interface elements with which the user may interact in order to configure which objects 1010 to query, as any filters 1020 to apply in the query. The GUI 1000 may display the results 1030 of the query. In this use case, the query returns the Order Amount and Order Quantity for Bikes and Clothing items made by Nancy Davolio Sales person. Additionally, in this use case, the query execution plan by the semantic layer of the information engine 146 is simple and consists of only one NATIVE_QUERY node having a native OLAP query in which filtering and aggregation operations are fully delegated to the OLAP database as described in its OLAP query specification below:

| OLAP Query Specification | | |
|---|---|---|
| Query axis | Query object | Selected members |
| COLUMS | Measures | [Measures].[Order Amount], [Measures].[Order Quantity] |
| ROWS | Product | [Bikes], [Bikes].children, [Clothing], [Clothing].children |
| FILTERS | Sales Person | [Nancy Davolio] |

If the SALES OLAP view is based on a OLAP MDX database, then the MDX query script generated from this OLAP query specification may be as follows:

| Native MDX query script |
| --- |
| SELECT<br>    NON EMPTY {[Measures].[Order Amount],<br>    [Measures].[Order Quantity]}<br>ON COLUMNS,<br>    NON EMPTY Hierarchize({[Product].[Product Categories].[Category].&[Bikes], [Product].[Product Categories].[Category].&[Bikes].Children, [Product].[Product Categories].[Category].&[Clothing], [Product].[Product Categories].[Category].&[Clothing].Children})<br>DIMENSION PROPERTIES PARENT_UNIQUE_NAME<br>ON ROWS<br>FROM [Sales]<br>WHERE [Sales Person].[Sales Person].[Sales Person]&<br>[Nancy Davolio] |

Figure 11:
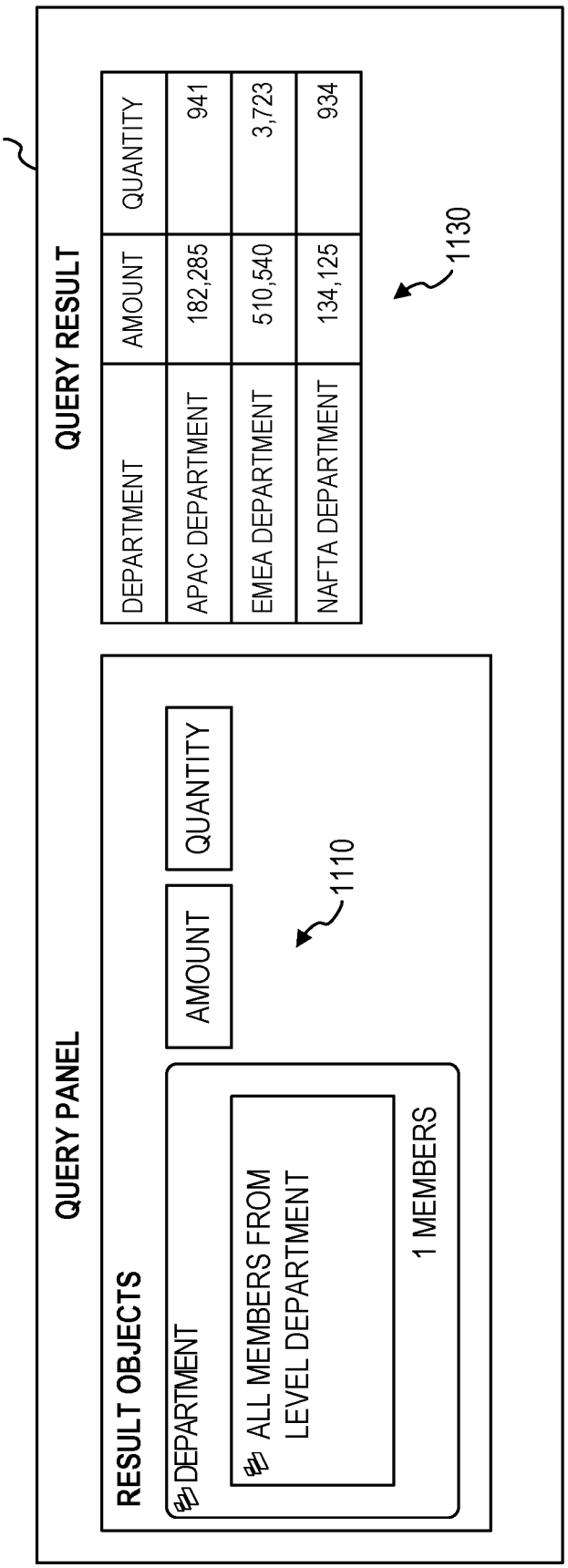
FIG. 11 shows an example of a query specification using objects coming two different OLAP views.

In a second use case, multiple OLAP views are queried. FIG. 11 shows an example of a query specification using objects 1110 coming from two different OLAP views, the SALES OLAP view (corresponding to OLAP view 400 in FIG. 4) and HR OLAP view (corresponding to OLAP view 610 in FIG. 6). In this use case, the query returns the Order Amount and Order Quantity (from the SALES OLAP view) per Department (from the HR OLAP view).

Figure 12:
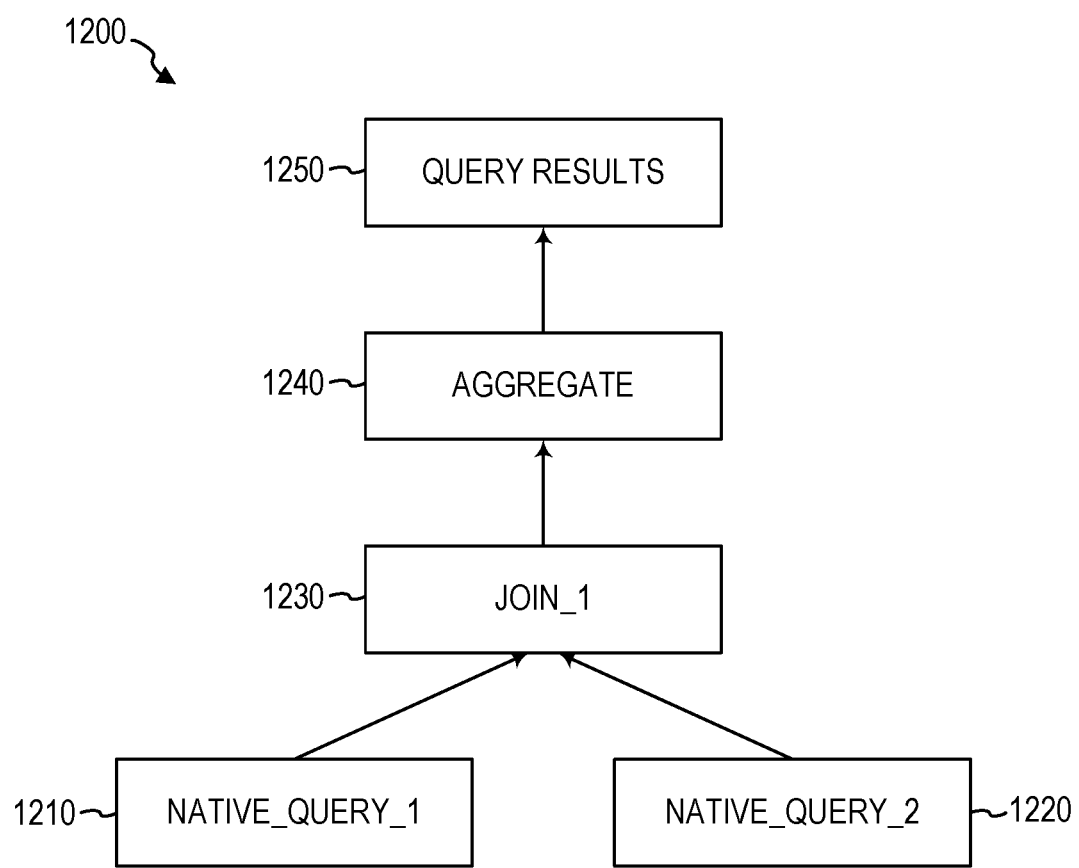
FIG. 12 shows an example of a query execution plan generated to retrieve data from two different OLAP cubes to federate them as one query result.

FIG. 12 shows an example query execution plan 1200 generated to retrieve data from two different OLAP cubes to federate them as one query result. The semantic layer of the information engine 146 may generate the query execution plan 1200 to retrieve data from the SALES and HR OLAP cubes to federate them as one query result. This query execution plan 1200 may be initialized by two NATIVE_QUERY nodes 1210 and 1220 having native OLAP query specifications described as below:

| OLAP Query Specification for NATIVE_QUERY_1 | | |
| --- | --- | --- |
| Query axis | Query object | Selected members |
| COLUMS | Measures | [Measures].[Order Amount], [Measures].[Order Quantity] |
| ROWS | Sales Person | [Sales Person].[Level01].members |

| OLAP Query Specification for NATIVE_QUERY_2 | | |
| --- | --- | --- |
| Query axis | Query object | Selected members |
| COLUMS | Measures | [Measures].[Number of employees] |
| ROWS | Department<br>Employees | [Department].[Level01].members<br>[Employees].members |

If the SALES and HR OLAP views are based on OLAP MDX databases, then the MDX query scripts generated for NATIVE_QUERY_1 and NATIVE-QUERY_2 nodes may be as follows:

| MDX query script for NATIVE_QUERY_1 |
| --- |
| SELECT<br>    NON EMPTY {[Measures].[Order Amount], [Measures].[Order Quantity]}<br>ON COLUMNS,<br>    NON EMPTY Hierarchize ({[Sales Person].[Sales Person].[Sales Person].Members}) ON ROWS<br>FROM [Sales] |

| MDX query script for NATIVE_QUERY_2 |
| --- |
| SELECT<br>    NON EMPTY {[Measures].[Number of employees]}<br>ON COLUMNS,<br>    NON EMPTY Crossjoin ({[Employee].[Employees].Members}, {[Department].[Department].[Department].Members}) ON ROWS<br>FROM [HR] |

The two nodes NATIVE_QUERY_1 and NATIVE_QUERY_2 are run to retrieve datasets. Once the datasets are retrieved, they are locally joined, at a join operation node 1230, using Sales Person and Employees members; and then aggregated, at an aggregation operation node 1240, by grouping values them by Department. The aggregated values may then be returned as query results, at node 1250.

For aggregable measures (e.g., based on aggregation functions such as SUM, COUNT, MIN, MAX, and AVERAGE), the application platform 100 may aggregate measures where multi-source hierarchies are involved. By default, aggregation operations may be delegated to databases when possible. However, when dealing with measures and hierarchies coming from different sources, the application platform 100 may roll up measures of child members into parent members. For example, when considering the Employees hierarchy (from the HR OLAP cube), the user may want to report not just an employee's Order Amount (from the SALES OLAP cube), but an employee's Order Amount plus the sum of their direct and indirect reports. In this case, the semantic layer of the information engine 146 may roll up measures of leaf employees into their reporters.

FIG. 13 shows an example of a query 1310 returning a query result 1330 from one OLAP view for members from another OLAP view.

In the example shown in FIG. 13, the query 1310 returns the Order Amount and Order Quantity (from the SALES OLAP view) for Employees (from the HR OLAP view). The query result 1330 is based on two NATIVE_QUERY nodes having native OLAP queries described as below:

| OLAP Query Specification for NATIVE_QUERY_1 | | |
| --- | --- | --- |
| Query axis | Query object | Selected members |
| COLUMS | Measures | [Measures].[Order Amount] |
| ROWS | Sales Person | [Sales Person].[Level01].members |

| OLAP Query Specification for NATIVE_QUERY_2 | | |
| --- | --- | --- |
| Query axis | Query object | Selected members |
| COLUMS | Measures | [Measures].[Number of employees] |
| ROWS | Employees | [Employees].members |

NATIVE_QUERY_1 and NATIVE_QUERY_2 nodes may be run to retrieve their datasets. These datasets may then be joined by using Sales Person and Employees members. The Order Amount and Order Quantity measures are rolled up by Employees members.

In some example embodiments, the application platform 100 may be configured to merge multidimensional OLAP data providers with other data providers inside the documents 122. As with joining OLAP views inside multi-source universes, the user can create combined cubes inside documents 122 by creating multi-source INNER, LEFT, RIGHT, or FULL OUTER joins between different OLAP data providers and other ones. On an OLAP data provider, a join is performed by setting up one or more join clauses on hierarchy levels or dimensions.

Figure 14:
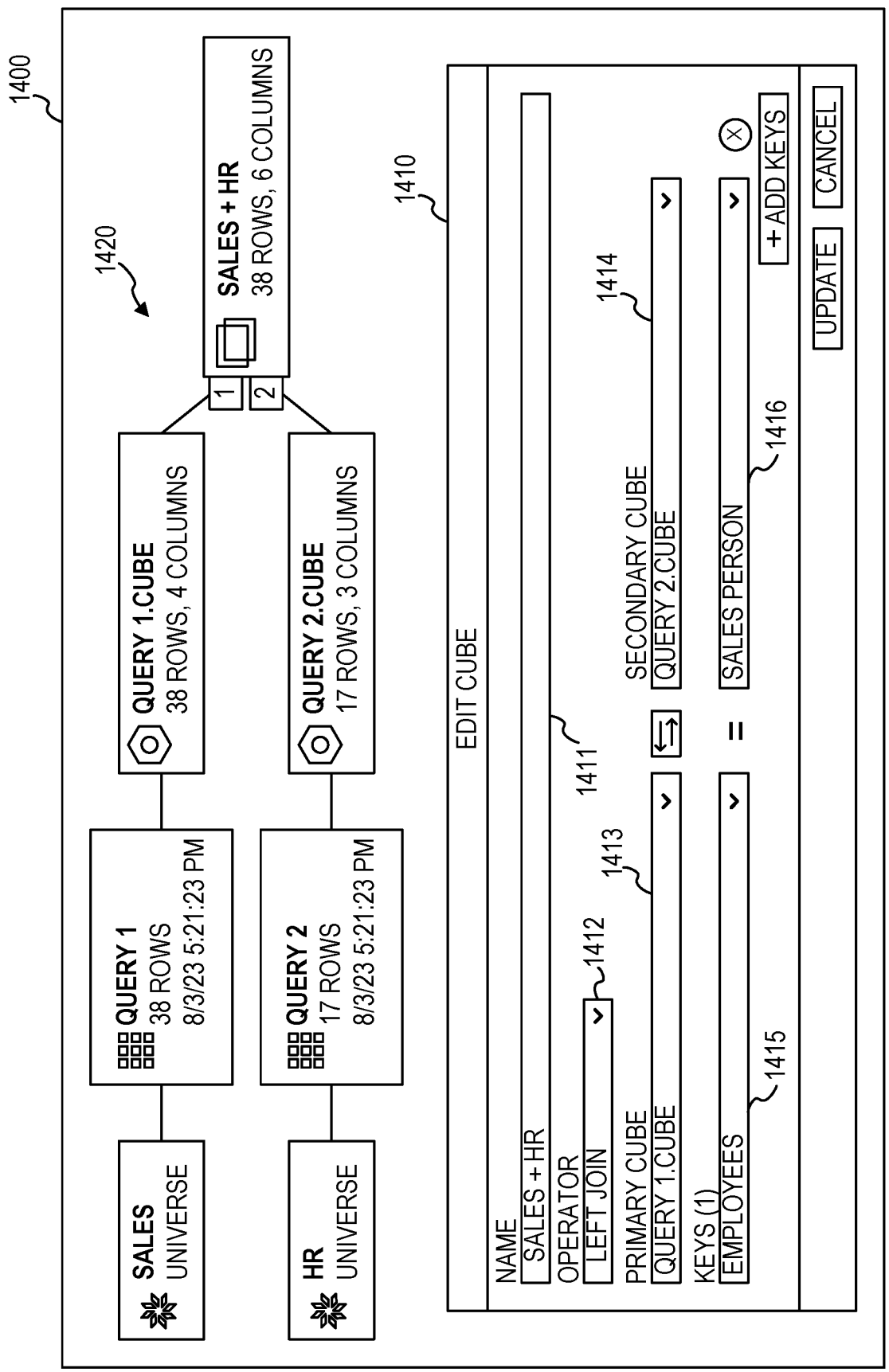
FIG. 14 shows an example of joins between two OLAP data sources based on two different OLAP cubes in business intelligence application.

FIG. 14 shows an example GUI 1400 in which joins between two OLAP data sources based on two different OLAP cubes in the business intelligence application 130 are shown. The GUI 1400 shows a configuration of the merging of queries for the two OLAP data sources in panel 1410, as well as a visual representation 1420 of the merging of the queries. The panel 1410 may comprise a plurality of user interface elements, such as user interface elements 1411, 1412, 1413, 1414, 1415, and 1416, with which the user may interact in order to configure the merging of the queries. In this example, the first OLAP data provider (based on the OLAP cube SALES) is linked to the second OLAP data provider (based on the OLAP cube HR) by creating a LEFT OUTER join between the Sales Person and Employees hierarchy levels to get all employee records. The results are like those returned with multi-source universes. As opposed to multi-source universes, the data federation and aggregation are based on local data available in the document. For instance, to evaluate the group totals over hierarchies, the report engine 144 aggregates values through their child members (even those who are not visible in the final report) available in the document.

The following workflow describes how to map multidimensional OLAP data in a multi-source universe with the information design tool 110. First, user A creates an OLAP connection on the top of an OLAP database. For example, user A may create an OLAP connection via an OLAP Connection Wizard Panel, submit information and credentials to connect to the OLAP database, and save and publish the OLAP connection to the repository 120. Next, user A may create a multi-source data foundation A on top of the created OLAP connection. Then, user A may insert OLAP views inside the multi-source data foundation, such as by browsing OLAP cubes available from the OLAP connection selected above, creating an OLAP view by selecting the OLAP cube user A wants to insert in the multi-source data foundation, browsing and selecting the OLAP cube elements (e.g., at least one hierarchy and one measure) to integrate in the OLAP view, and selecting to insert the OLAP view in the multi-source data foundation layer.

User A may optionally insert other OLAP views and relational tables from other connections in the multi-source data foundation. User A may then combine OLAP views and relational tables in the multi-source data foundation layer, such as by creating multi-source joins to link OLAP views with other OLAP views (if any) in the multi-source data foundation, creating multi-source joins to link OLAP views with relational tables (if any) in the multi-source data foundation, and saving the multi-source data foundation layer.

Next, user A may create a business layer on top of the multi-source data foundation, such as by selecting the multi-source data foundation created above. The business layer may be automatically generated with dimensions, hierarchies, attributes, and measures on the top of different OLAP views and relational tables available in the selected multi-source data foundation. User A may then generate the multi-source universe from the business layer and publish it in the repository 120. This universe can be used in tools of the business intelligence application 130 to create documents that query the underlying data sources.

The following workflow describes how to user a reporting tool of the business intelligence application 130 to combine datasets coming from OLAP cube(s) and relational table(s). The resulting artefact, a combined cube, federates datasets available in a document or story. User B may create a document or story on top of an OLAP data source. User B may select an OLAP data source; for instance, the HR OLAP cube. In a query panel, user B may create a first query (Query1) and add business objects (e.g., dimensions, hierarchies, attributes, and measures) to this query. For example, user B may select the Employees and Department hierarchies, and Number of employees measure. User B may then run Query1 and retrieve the dataset and the selected business objects in the document. An OLAP view is created based on the objects selected in the query panel. Next, user B may add a second query on top of an OLAP data source in this document. For example, user B may create a new query (Query2) on top of another OLAP data source (e.g., the SALES OLAP cube), and then, in the query panel, add business objects (e.g., dimensions, hierarchies, attributes, and measures) to this query. For example, user B may retrieve the Sales Person and Product Categories hierarchies and the Order Amount measure. User B may run Query2 and retrieve the dataset and the selected business objects in the document. A second OLAP view may be created based on the objects selected in the query panel.

User B may create a combined cube to merge the two retrieved datasets inside the document or story. For example, user B may create a combined cube using the application platform 100, and then, in an editor for the combined cube, select Query1 and Query2 created above. User B may also select the join type to merge these two queries (e.g., LEFT OUTER join type). In each query, user B may select the hierarchy levels or dimensions to use for the join clause. For example, user B may select Employees hierarchy level for Query1, and Sales Person hierarchy level for Query2. User B may create the combined cube in the document. As a result, objects from Query1 and Query2 are now linked in the document, and the two OLAP views are combined as one. The document may be saved and published in the repository 120. This document and its linked objects can be shared and used by many other documents through features of the business intelligence application 130.

The following workflow describes how the application platform 100 may use multi-source universes to integrate multidimensional OLAP data in a query panel at query time. User C may create a document on top of the multi-source universe previously created. User C may create a query with the query panel, select a hierarchy and a measure from the universe outline (regardless their origins) and add them in the query panel as result object, create a member selection on the selected hierarchy in using a member selector tool, and select member sets using available member set expressions. User C may then run the query. The request may be sent to the semantic layer of the information engine 146 that generates a query execution plan with native query scripts to execute on the adjacent data sources. The raw dataset may be retrieved from adjacent data sources and processed locally by the information engine 146 to produce one federated data result. The federated data may be stored in the document micro-cube (cache). For hierarchical data, hierarchy column properties (e.g., MEMBER_PARENT, MEMBER_KEY, MEMBER_CAPTION and MEMBER_DEPTH) may be added to hierarchize data in the document. User C may then save and publishes this document in the repository 120. The document may be saved with the multi-source universe metadata (e.g., dimensions, hierarchies, attributes and measures used in the query) and federated dataset retrieved at query time.

The following workflow describes how to use federated OLAP data and objects (coming from multi-source universes or documents) in the report at view time. User D may open and refresh the document (created by User B or by User C) having federated OLAP data and objects. User D may leverage the multi-source OLAP objects in reports, regardless of their origins. For example, user D may create tables and graphics with multi-source OLAP data and objects, create tables and graphics with hierarchical federated OLAP data, drill up/down on federated OLAP data, create variables or formulas with multi-source OLAP objects, create report filters with multi-source OLAP objects, and create report input with multi-source OLAP objects.

In view of the disclosure above, various examples are set forth below. It should be noted that one or more features of an example, taken in isolation or combination, should be considered within the disclosure of this application.

Example 1 includes a computer-implemented method performed by a computer system having a memory and at least one hardware processor, the computer-implemented method comprising: creating a first view of a first data source in a data foundation layer of an application platform based on a first user input, the first data source comprising a first online analytical processing (OLAP) cube; creating a second view of a second data source in the data foundation layer based on a second user input, the second data source being different from the first data source; combining the first view of the first data source and the second view of the second data source in the data foundation layer; creating metadata objects for elements of the first view of the first data source and the second view of the second data source in the data foundation layer; generating a query execution plan based on a user-defined query specification and the metadata objects in the data foundation layer, the query execution plan comprising a first native query and a second native query; executing the first native query on the first data source to retrieve a first dataset from the first data source; executing the second native query on the second data source to retrieve a second dataset from the second data source; and generating a federated dataset using the first dataset and the second dataset.

Example 2 includes the computer-implemented method of example 1, wherein the first user input comprises a selection of at least one hierarchy and at least one measure of the first OLAP cube.

Example 3 includes the computer-implemented method of example 1 or example 2, wherein the second data source comprises a second OLAP cube different from the first OLAP cube.

Example 4 includes the computer-implemented method of any one of examples 1 to 3, wherein the second data source comprises a first relational database.

Example 5 includes the computer-implemented method of any one of examples 1 to 4, wherein the combining of the first view of the first data source and the second view of the second data source in the data foundation layer comprises combining the first view and the second view into a single data scheme using a join operation.

Example 6 includes the computer-implemented method of any one of examples 1 to 5, wherein the query execution plan comprises a tree structure, the tree structure comprising corresponding nodes for the first native query and the second native query.

Example 7 includes the computer-implemented method of any one of examples 1 to 6, wherein the computer operations further comprise performing a function of the application platform using the federated dataset.

Example 8 includes the computer-implemented method of any one of examples 1 to 7, wherein the performing of the function of the application platform using the federated dataset comprises causing the federated dataset to be displayed on a computing device.

Example 9 includes the computer-implemented method of any one of examples 1 to 8, wherein the performing of the function of the application platform using the federated dataset comprises performing one or more analytics functions.

Example 10 includes the computer-implemented method of any one of examples 1 to 9, wherein the performing of the function of the application platform using the federated dataset comprises storing the federated dataset on the application platform.

Example 11 includes a system comprising: at least one processor; and a non-transitory computer-readable medium storing executable instructions that, when executed, cause the at least one processor to perform the method of any one of examples 1 to 10.

Example 12 includes a non-transitory machine-readable storage medium, tangibly embodying a set of instructions that, when executed by at least one processor, causes the at least one processor to perform the method of any one of examples 1 to 10.

Example 13 includes a machine-readable medium carrying a set of instructions that, when executed by at least one processor, causes the at least one processor to carry out the method of any one of examples 1 to 10.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 114 of FIG. 1) and via one or more appropriate interfaces (e.g., APIs).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

Figure 15:
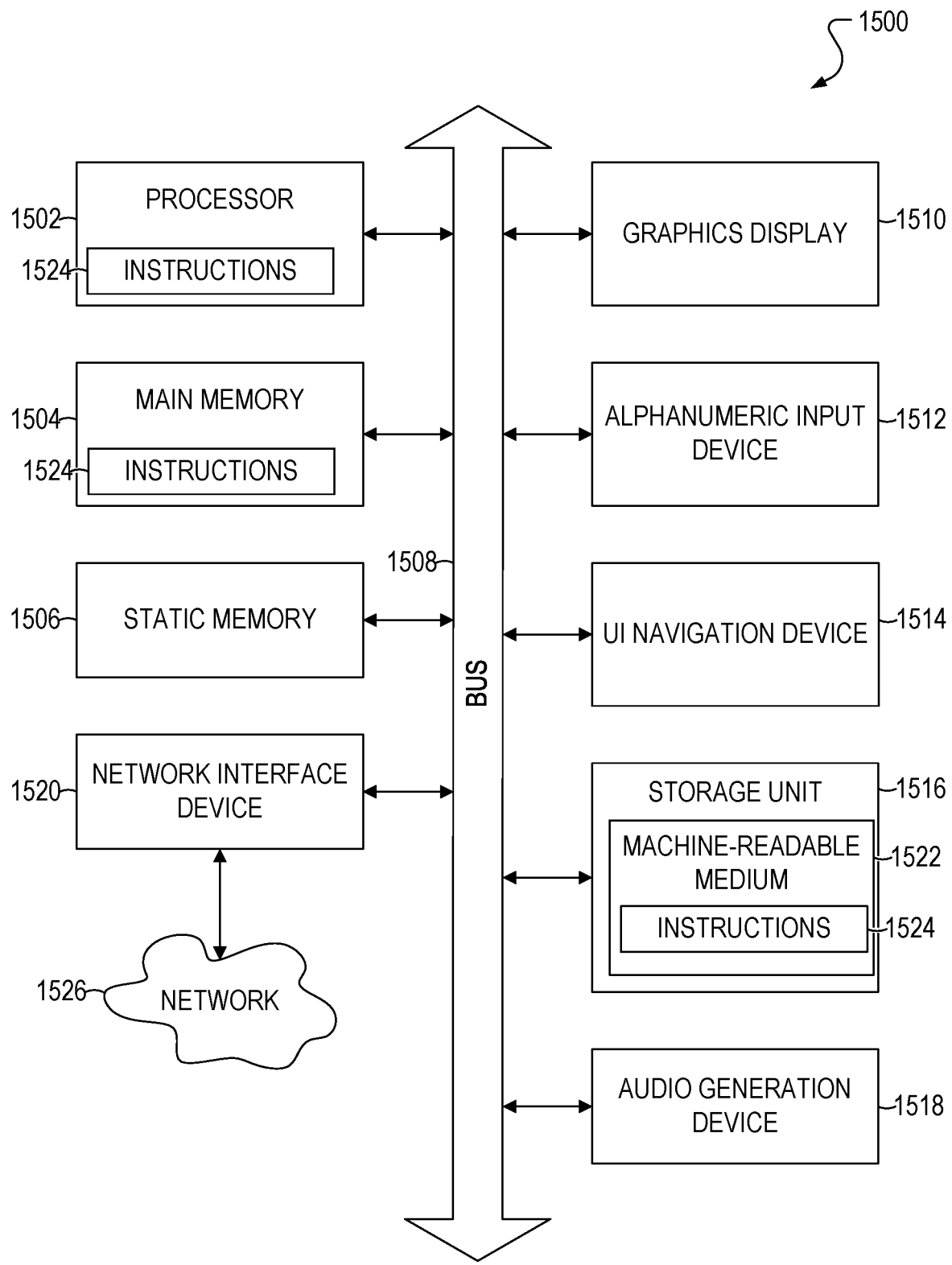
FIG. 15 is a block diagram of an example computer system on which methodologies described herein can be executed.

FIG. 15 is a block diagram of a machine in the example form of a computer system 1500 within which instructions 1524 for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1500 includes a processor 1502 (e.g., a central processing unit (CPU), a graphics processing unit (GPU) or both), a main memory 1504, and a static memory 1506, which communicate with each other via a bus 1508. The computer system 1500 may further include a graphics or video display unit 1510 (e.g., a liquid crystal display (LCD) or a cathode ray tube (CRT)). The computer system 1500 also includes an alphanumeric input device 1512 (e.g., a keyboard), a user interface (UI) navigation (or cursor control) device 1514 (e.g., a mouse), a storage unit (e.g., a disk drive unit) 1516, an audio or signal generation device 1518 (e.g., a speaker), and a network interface device 1520.

The storage unit 1516 includes a machine-readable medium 1522 on which is stored one or more sets of data structures and instructions 1524 (e.g., software) embodying or utilized by any one or more of the methodologies or functions described herein. The instructions 1524 may also reside, completely or at least partially, within the main memory 1504 and/or within the processor 1502 during execution thereof by the computer system 1500, the main memory 1504 and the processor 1502 also constituting machine-readable media. The instructions 1524 may also reside, completely or at least partially, within the static memory 1506.

While the machine-readable medium 1522 is shown in an example embodiment to be a single medium, the term "machine-readable medium" may include a single medium or multiple media (e.g., a centralized or distributed database, and/or associated caches and servers) that store the one or more instructions 1524 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

The instructions 1524 may further be transmitted or received over a communications network 1526 using a transmission medium. The instructions 1524 may be transmitted using the network interface device 1520 and any one of a number of well-known transfer protocols (e.g., HTTP). Examples of communication networks include a LAN, a WAN, the Internet, mobile telephone networks, POTS networks, and wireless data networks (e.g., WiFi and WiMAX networks). The term "transmission medium" shall be taken to include any intangible medium capable of storing, encoding, or carrying instructions for execution by the machine, and includes digital or analog communications signals or other intangible media to facilitate communication of such software.

This detailed description is merely intended to teach a person of skill in the art further details for practicing certain aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

Unless specifically stated otherwise, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A system of comprising:
   at least one hardware processor; and
   a non-transitory computer-readable medium storing executable instructions that, when executed, cause the at least one hardware processor to perform computer operations comprising:
      creating a first view of a first data source in a data foundation layer of an application platform based on a first user input, the first data source comprising a first online analytical processing (OLAP) cube;
      creating a second view of a second data source in the data foundation layer based on a second user input, the second data source being different from the first data source;
      combining the first view of the first data source and the second view of the second data source in the data foundation layer;
      creating metadata objects for elements of the first view of the first data source and the second view of the second data source in the data foundation layer;
      generating a query execution plan based on a user-defined query specification and the metadata objects in the data foundation layer, the query execution plan comprising a first native query and a second native query;
      executing the first native query on the first data source to retrieve a first dataset from the first data source;
      executing the second native query on the second data source to retrieve a second dataset from the second data source; and
      generating a federated dataset using the first dataset and the second dataset.

2. The system of claim 1, wherein the first user input comprises a selection of at least one hierarchy and at least one measure of the first OLAP cube.

3. The system of claim 1, wherein the second data source comprises a second OLAP cube different from the first OLAP cube.

4. The system of claim 1, wherein the second data source comprises a first relational database.

5. The system of claim 1, wherein the combining of the first view of the first data source and the second view of the second data source in the data foundation layer comprises combining the first view and the second view into a single data scheme using a join operation.

6. The system of claim 1, wherein the query execution plan comprises a tree structure, the tree structure comprising corresponding nodes for the first native query and the second native query.

7. The system of claim 1, wherein the computer operations further comprise performing a function of the application platform using the federated dataset.

8. The system of claim 7, wherein the performing of the function of the application platform using the federated dataset comprises causing the federated dataset to be displayed on a computing device.

9. The system of claim 7, wherein the performing of the function of the application platform using the federated dataset comprises performing one or more analytics functions.

10. The system of claim 7, wherein the performing of the function of the application platform using the federated dataset comprises storing the federated dataset on the application platform.

11. A computer-implemented method comprising:
   creating a first view of a first data source in a data foundation layer of an application platform based on a first user input, the first data source comprising a first online analytical processing (OLAP) cube;
   creating a second view of a second data source in the data foundation layer based on a second user input, the second data source being different from the first data source;
   combining the first view of the first data source and the second view of the second data source in the data foundation layer;
   creating metadata objects for elements of the first view of the first data source and the second view of the second data source in the data foundation layer;
   generating a query execution plan based on a user-defined query specification and the metadata objects in the data foundation layer, the query execution plan comprising a first native query and a second native query;
   executing the first native query on the first data source to retrieve a first dataset from the first data source;
   executing the second native query on the second data source to retrieve a second dataset from the second data source; and
   generating a federated dataset using the first dataset and the second dataset.

12. The computer-implemented method of claim 11, wherein the first user input comprises a selection of at least one hierarchy and at least one measure of the first OLAP cube.

13. The computer-implemented method of claim 11, wherein the second data source comprises a second OLAP cube different from the first OLAP cube.

14. The computer-implemented method of claim 11, wherein the second data source comprises a first relational database.

15. The computer-implemented method of claim 11, wherein the query execution plan comprises a tree structure, the tree structure comprising corresponding nodes for the first native query and the second native query.

16. The computer-implemented method of claim 11, further comprising performing a function of the application platform using the federated dataset.

17. The computer-implemented method of claim 16, wherein the performing of the function of the application platform using the federated dataset comprises causing the federated dataset to be displayed on a computing device.

18. The computer-implemented method of claim 16, wherein the performing of the function of the application platform using the federated dataset comprises performing one or more analytics functions.

19. The computer-implemented method of claim 16, wherein the performing of the function of the application platform using the federated dataset comprises storing the federated dataset on the application platform.

20. A non-transitory machine-readable storage medium tangibly embodying a set of instructions that, when executed by at least one hardware processor, causes the at least one hardware processor to perform computer operations comprising:

creating a first view of a first data source in a data foundation layer of an application platform based on a first user input, the first data source comprising a first online analytical processing (OLAP) cube;

creating a second view of a second data source in the data foundation layer based on a second user input, the second data source being different from the first data source;

combining the first view of the first data source and the second view of the second data source in the data foundation layer;

creating metadata objects for elements of the first view of the first data source and the second view of the second data source in the data foundation layer;

generating a query execution plan based on a user-defined query specification and the metadata objects in the data foundation layer, the query execution plan comprising a first native query and a second native query;

executing the first native query on the first data source to retrieve a first dataset from the first data source;

executing the second native query on the second data source to retrieve a second dataset from the second data source; and generating a federated dataset using the first dataset and the second dataset.

* * * * *